US010443580B2

(12) United States Patent
Hansen et al.

(10) Patent No.: US 10,443,580 B2
(45) Date of Patent: Oct. 15, 2019

(54) WIND TURBINE GENERATOR ASSEMBLIES

(71) Applicant: MHI Vestas Offshore Wind A/S, Aarhus N (DK)

(72) Inventors: Morten Frost Hansen, Langå (DK); Peter Nordlyng, Hobro (DK); Mark Ursell-Smith, Ebeltoft (DK); Kim Christensen, Randers Nv (DK); Ken Nakayama, Højbjerg (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 15/515,854

(22) PCT Filed: Sep. 16, 2015

(86) PCT No.: PCT/DK2015/050277
§ 371 (c)(1),
(2) Date: Mar. 30, 2017

(87) PCT Pub. No.: WO2016/055067
PCT Pub. Date: Apr. 14, 2016

(65) Prior Publication Data
US 2017/0241410 A1 Aug. 24, 2017

(30) Foreign Application Priority Data
Oct. 7, 2014 (DK) .................. 2014 70620

(51) Int. Cl.
F03D 80/80 (2016.01)
F03D 13/25 (2016.01)
(Continued)

(52) U.S. Cl.
CPC ............. F03D 80/82 (2016.05); E04H 12/34 (2013.01); F03D 9/25 (2016.05); F03D 13/10 (2016.05);
(Continued)

(58) Field of Classification Search
CPC .......... F03D 80/82; F03D 13/10; F03D 13/25; E04H 12/34; F05B 2260/845; F05B 2240/95; F05B 2240/912
See application file for complete search history.

(56) References Cited

U.S. PATENT DOCUMENTS 5,075,564 A * 12/1991 Hickey .................... B63H 9/06
290/44
6,400,039 B1 * 6/2002 Wobben .................. F03D 9/255
290/44

(Continued)

FOREIGN PATENT DOCUMENTS

CN 203742903 A 7/2014
DE 102012108577 A1 3/2014
(Continued)

OTHER PUBLICATIONS

European Patent Office, International Search Report and Written Opinion in PCT Application Serial No. PCT/DK2015/050277, dated Dec. 3, 2015.

(Continued)

Primary Examiner — Joshua K Ihezie
(74) Attorney, Agent, or Firm — Wood Herron & Evans LLP

(57) ABSTRACT

An offshore wind turbine generator comprises a tower 1 and a platform 2. The tower 1 is provided with a side door 4 accessed from the platform 2 using a stairway 5 leading to an upper platform 6. The upper platform 6 is formed from the upper surface of a cabinet 7 which houses a diesel backup generator. Both the backup generator and the cabinet 7 are mounted to the tower 1 by bolts, such that the cabinet and backup generator are fully supported by the tower 1. A diesel fuel tank 12 is also mounted to the tower 1 by bolts. The fuel tank supplies diesel fuel to the backup generator.

14 Claims, 5 Drawing Sheets

(51) Int. Cl.
  *F03D 9/25* (2016.01)
  *F03D 13/10* (2016.01)
  *F03D 13/20* (2016.01)
  *E04H 12/34* (2006.01)

(52) U.S. Cl.
  CPC ............. *F03D 13/20* (2016.05); *F03D 13/25* (2016.05); *F03D 80/88* (2016.05); *F05B 2240/14* (2013.01); *F05B 2240/912* (2013.01); *F05B 2240/95* (2013.01); *F05B 2260/845* (2013.01); *F05B 2270/107* (2013.01); *Y02B 10/30* (2013.01); *Y02E 10/725* (2013.01); *Y02E 10/727* (2013.01); *Y02E 10/728* (2013.01)

(56) References Cited

U.S. PATENT DOCUMENTS

| | | | | |
|---|---|---|---|---|
| RE41,073 E | * | 1/2010 | Wobben | F03D 9/255 290/44 |
| 2006/0233613 A1 | * | 10/2006 | Welch, Jr. | E02B 9/08 405/76 |
| 2007/0056801 A1 | * | 3/2007 | Iversen | F03D 80/50 182/141 |
| 2007/0296220 A1 | * | 12/2007 | Kristensen | B66B 9/187 290/55 |
| 2010/0259050 A1 | * | 10/2010 | Meller | F03D 1/025 290/55 |
| 2011/0176919 A1 | * | 7/2011 | Coffey | F03D 3/005 416/124 |
| 2011/0248506 A1 | * | 10/2011 | Ruiz Urien | F03D 80/88 290/55 |
| 2012/0031094 A1 | * | 2/2012 | de Bruijn | F03G 6/065 60/641.11 |
| 2012/0049532 A1 | * | 3/2012 | Scholte-Wassink | F03D 13/25 290/55 |
| 2012/0107149 A1 | * | 5/2012 | Wong | F03D 9/028 417/334 |
| 2012/0131880 A1 | * | 5/2012 | Delago | E04H 12/342 52/745.18 |
| 2012/0217748 A1 | * | 8/2012 | Gjerlov | F03D 7/0204 290/44 |
| 2012/0243943 A1 | * | 9/2012 | Bogl | E02B 17/02 405/205 |
| 2012/0261926 A1 | * | 10/2012 | Van Den Bulcke | F03D 1/02 290/55 |
| 2014/0015255 A1 | * | 1/2014 | Schellstede | F03D 9/002 290/55 |
| 2014/0084592 A1 | * | 3/2014 | Pescarmona | F03D 9/002 290/55 |
| 2014/0252770 A1 | | 9/2014 | Patel et al. | |
| 2014/0265345 A1 | * | 9/2014 | Grieve | F03D 15/00 290/55 |
| 2014/0285005 A1 | * | 9/2014 | Casteel | H02S 10/40 307/23 |
| 2014/0361540 A1 | * | 12/2014 | Knight | F03D 80/88 290/44 |
| 2015/0108764 A1 | * | 4/2015 | Moeller | F03D 9/005 290/55 |
| 2015/0275850 A1 | * | 10/2015 | Numajiri | F03D 80/50 290/55 |
| 2016/0025064 A1 | * | 1/2016 | Hashimoto | B63B 21/50 29/593 |
| 2016/0156207 A1 | * | 6/2016 | Frankenberger | H02J 7/0027 320/101 |
| 2017/0096985 A1 | * | 4/2017 | Bardia | F03D 9/007 |

FOREIGN PATENT DOCUMENTS

| | | |
|---|---|---|
| EP | 2511525 A2 | 10/2012 |
| EP | 2586933 A1 | 5/2013 |
| WO | 0146583 A2 | 6/2001 |
| WO | 2012098384 A1 | 7/2012 |
| WO | 2014112115 A1 | 7/2014 |

OTHER PUBLICATIONS

Danish Patent and Trademark Office, Search Report in PA 2014/70620, dated Jun. 16, 2015.
China National Intellectual Property Administration, 2nd Notification of Office Action in CN Application No. 201580054278.X, dated Apr. 9, 2019.

* cited by examiner

WIND TURBINE GENERATOR ASSEMBLIES

WIND TURBINE GENERATOR ASSEMBLIES

The present invention relates to assemblies for wind turbine generators and to arrangements for accommodating backup generators and/or fuel supplies for backup generators.

Wind turbine generators are arranged to convert energy from wind into electricity which may be supplied to the mains electricity grid. Each generator requires a supply of power for auxiliary equipment such as safety systems, and this is usually supplied from a rechargeable battery which is recharged by a battery charger using power from either the output of the wind turbine generator itself or from the mains grid.

Wind turbine generators are often equipped with a backup generator, such as a diesel generator, for supplying power to the auxiliary equipment and/or the battery charger when there is no wind and/or in the event of the wind turbine generator becoming disconnected from the mains grid.

The present invention seeks to provide improvements to such wind turbine generators.

Thus, in accordance with a first aspect of the present invention there is provided an assembly comprising:
a tower for supporting a wind turbine generator, the tower comprising a wall having an outer surface which in use is oriented substantially vertically; and
a backup generator mounted to the outer surface of the wall, the arrangement being such that the weight of the backup generator is supported substantially only by the wall of the tower.

By using the tower to support the weight of the backup generator, this avoids the need for an additional support structure.

Furthermore, by providing the backup generator in a location which is external to the tower, this provides the following technical advantages: (a) the backup generator can readily be accessed by service personnel without having to enter the tower; (b) heat generated by the backup generator can more readily be dissipated; and (c) in the event of the generator developing a fire, this can more readily be extinguished.

The backup generator is preferably mounted to the wall of the tower by one or more bolts, since this does not require internal access to the tower.

In a preferred arrangement, the backup generator is housed within a cabinet. This provides protection from rain and other adverse weather conditions.

In this case, the cabinet is preferably mounted to the wall of the tower by one or more bolts. In this way, the cabinet can be attached to the wall of the tower without requiring internal access to the tower.

The backup generator is conveniently powered by a fuel, for example, diesel, gasoline or natural gas. This provides the advantage that, in combination with a supply of the fuel, the generator can be self-contained and not require an external source of power. In the preferred embodiment, the backup generator is powered by diesel fuel.

The assembly preferably further comprises a platform mounted to the tower at a position which, in use, is below the backup generator. This provides a suitable support surface for service personnel when servicing or repairing the backup generator. The platform preferably extends fully around the perimeter of the tower to provide service personnel with suitable access to all sides of the tower.

In the preferred embodiment, a stairway is arranged between the platform and an upper surface which in use is above the backup generator, the arrangement being such that the footprints of the upper surface and the backup generator overlap when viewed downwardly.

The upper surface is preferably attached to the tower such that the weight of service personnel standing on the upper surface is transferred to the tower without requiring additional support from below.

The expression "footprints" is here intended to refer to the horizontal area occupied by the upper surface and the backup generator. With such an arrangement, the functionality of the stairway and the backup generator can be combined in a compact arrangement. Indeed, in the preferred arrangement in which the footprint of the backup generator is wholly within that of the upper surface, no additional area of the platform is required for the provision of the backup generator.

When the backup generator is housed within a cabinet, the cabinet itself may comprise the upper surface. Thus, when the cabinet is mounted to the tower, the weight of service personnel standing on the upper surface is transferred to the tower without requiring additional support from below.

The stairway is advantageously located adjacent the tower. The word "adjacent" is intended to mean that personnel climbing the stairway do not face the tower. This enables personnel to climb the stairway while remaining close to the tower. Furthermore, if any guiderails are provided on the stairway, these need only be positioned on the one side of the stairway remote from the tower, i.e. on the external side of the stairway.

In accordance with a further aspect of the present invention there is provided an assembly comprising:
a tower for supporting a wind turbine generator, the tower comprising a wall having an outer surface which in use is oriented substantially vertically; and
a fuel tank for a backup generator mounted to the outer surface of the wall, the arrangement being such that the weight of the fuel tank is supported substantially only by the wall of the tower.

By using the tower to support the weight of the fuel tank, this avoids the need for an additional support structure.

Furthermore, by providing the fuel tank in a location which is external to the tower, the fuel tank can readily be accessed by service personnel without having to enter the tower.

The fuel tank is preferably mounted to the wall of the tower by one or more bolts, such that the fuel tank can be attached to the wall of the tower without requiring internal access to the tower.

Although not a feature of the preferred embodiment, it would be possible to house the fuel tank within a cabinet to provide additional protection from rain and other adverse weather conditions.

Wind turbine towers are typically circular in cross section. When this invention is applied to such circular towers, the fuel tank is also preferably curved so as to match the profile of the outer surface of the tower and thereby reduce the footprint of the fuel tank. Furthermore, by matching the profile in this way, it is easier to mount the fuel tank to the tower.

The above arrangements can conveniently be combined. Thus, the assembly preferably further comprises a fuel tank for the backup generator, the fuel tank being mounted to the outer wall of the tower, the arrangement being such that the weight of the fuel tank is supported substantially only by the wall of the tower.

In embodiments which include both a fuel tank and a platform, the platform is preferably formed with an extended area to enable personal to walk freely around the front of the fuel tank.

The present invention extends to a wind turbine generator comprising any of the above-described assemblies.

In accordance with a further aspect of the present invention there is provided a method of installing a tower for a wind turbine generator, the method comprising forming an assembly as claimed in any one of claims 1 to 12 prior to installing the tower.

Thus, the assembly can be formed at a convenient location, such as within a manufacturing plant, and the completed assembly then transported to the desired location of the wind turbine generator.

This invention is particularly advantageous when the wind turbine generator is to be located offshore, in which case the assembly is preferably formed at an onshore location prior to transportation and installation at the desired offshore location.

Preferred embodiments of the invention will now be described with reference to the accompanying drawings, in which.

Figure 1:
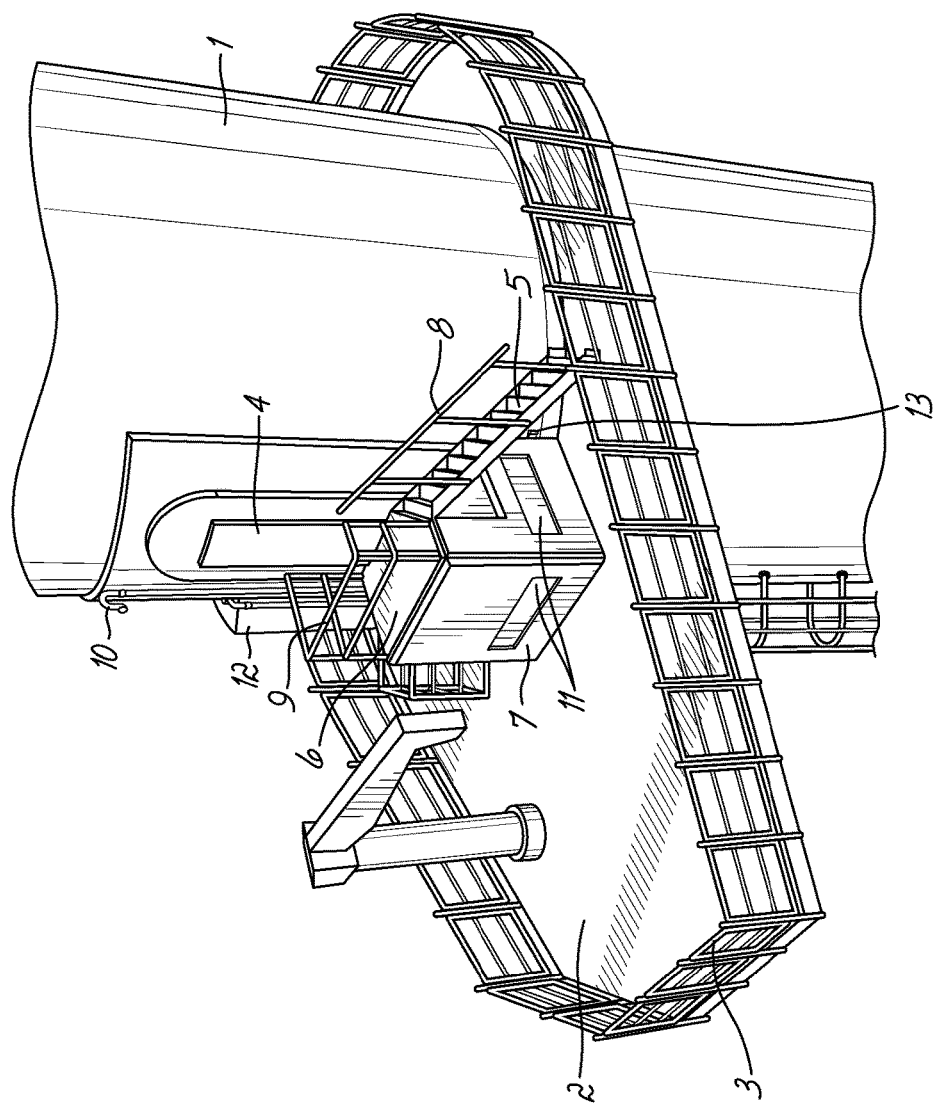
FIG. 1 illustrates an assembly of a backup generator, a fuel tank and a wind turbine generator tower in accordance with a preferred embodiment of the present invention.

Referring to FIG. 1, a tower 1 for supporting a wind turbine generator (not shown) is mounted in an offshore location. A platform 2 is attached to the tower 1 and enables personnel to perform servicing operations both inside and outside the tower 1. A safety railing 3 is provided at perimeter of the platform 2.

The tower 1 is provided with a side door 4 for use by service personnel for performing maintenance operations inside the tower 1.

The side door 4 is accessed from the platform 2 by means of a stairway 5 which leads to an upper platform 6. The upper platform 6 is formed by the upper surface of a cabinet 7 which houses a diesel backup generator (not shown) for supplying auxiliary equipment within the wind turbine generator with backup power in the event of a failure in the connection to the mains electricity grid and/or when there is no wind to power the turbine. The stairway 5 is positioned immediately adjacent the tower 1 and is provided with a single handrail 8 on the left-hand side of the stairway 5 as viewed when climbing the stairway 5. A safety railing 9 is provided around the upper platform 6. As can be seen from the drawing, the cabinet 7 defines a substantially rectangular footprint on the platform 2 which does not extend beyond the sides of the upper surface of the cabinet 7.

Both the cabinet 7 and the diesel backup generator are mounted directly to the tower 1 by bolts 13 such that both the cabinet 7 and the backup generator are fully supported by the tower 1 and not by the platform 2.

An exhaust pipe 10 extends vertically from the backup generator and expels exhaust gases at a position well above the generator cabinet 7.

The walls of the generator cabinet 7 are provided with grilles 11 to allow for heat dissipation during operation.

Also mounted to the tower 1 is a curved fuel tank 12 containing diesel fuel for the backup generator.

Figure 2:
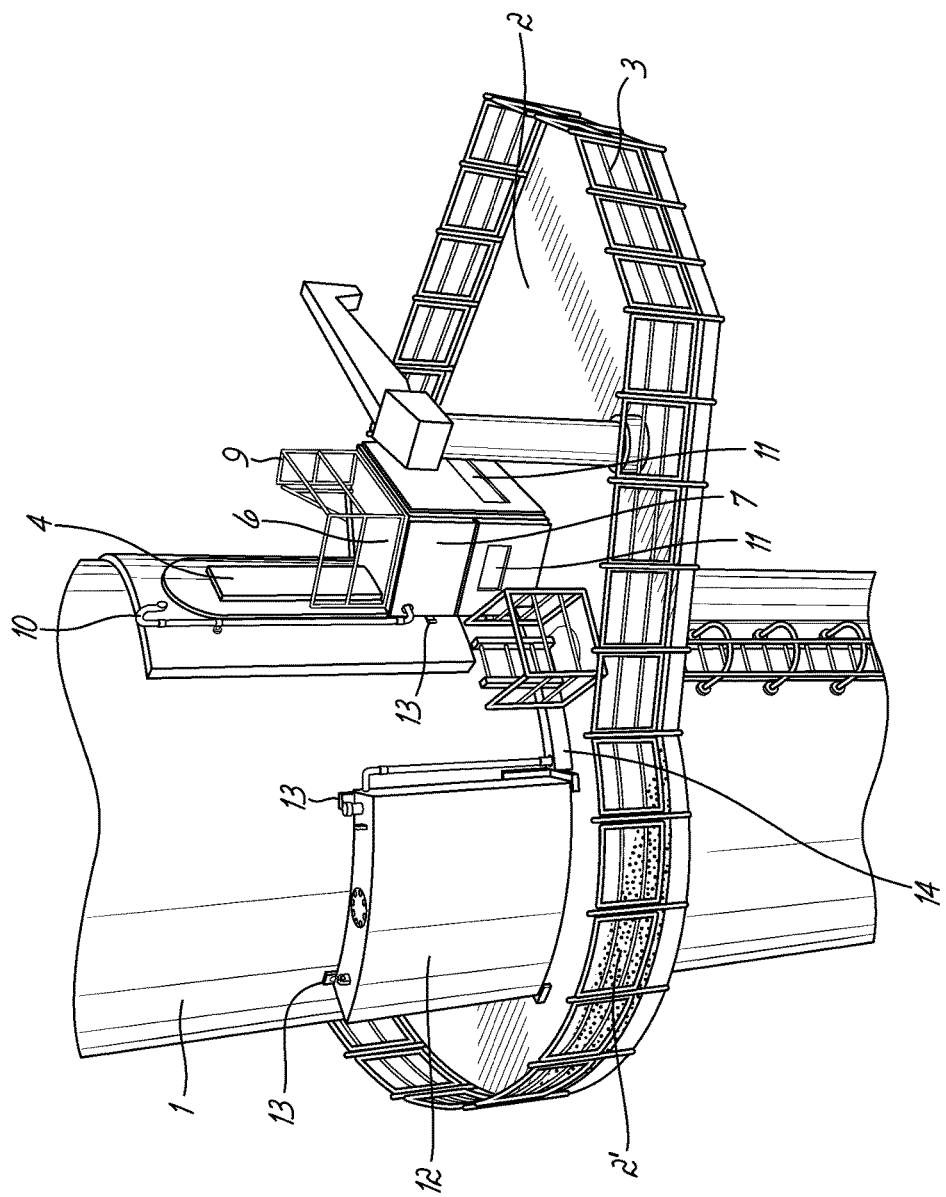
FIG. 2 illustrates the assembly of FIG. 1 from a different angle.

Referring to FIG. 2, in which the same reference numbers are used to indicate the same or corresponding features, the fuel tank 12 is mounted to the wall of the tower 1 using bolts 13. As can be seen in the drawing, the fuel tank 12 is curved so as to adopt the same profile as the wall of the tower 1. A fuel pipe 14 conveys diesel fuel from the fuel tank 12 to the diesel backup generator within the generator cabinet 7.

The platform 2 is of sufficient size to enable service personnel to walk around the complete perimeter of the tower 1. Since the fuel tank 12 occupies a considerable area of the platform 2, the platform 2 is formed with an extended area 2 (illustrated in the drawing by the shaded area 2'), to enable service personnel to walk freely around the fuel tank 12.

Figure 3:
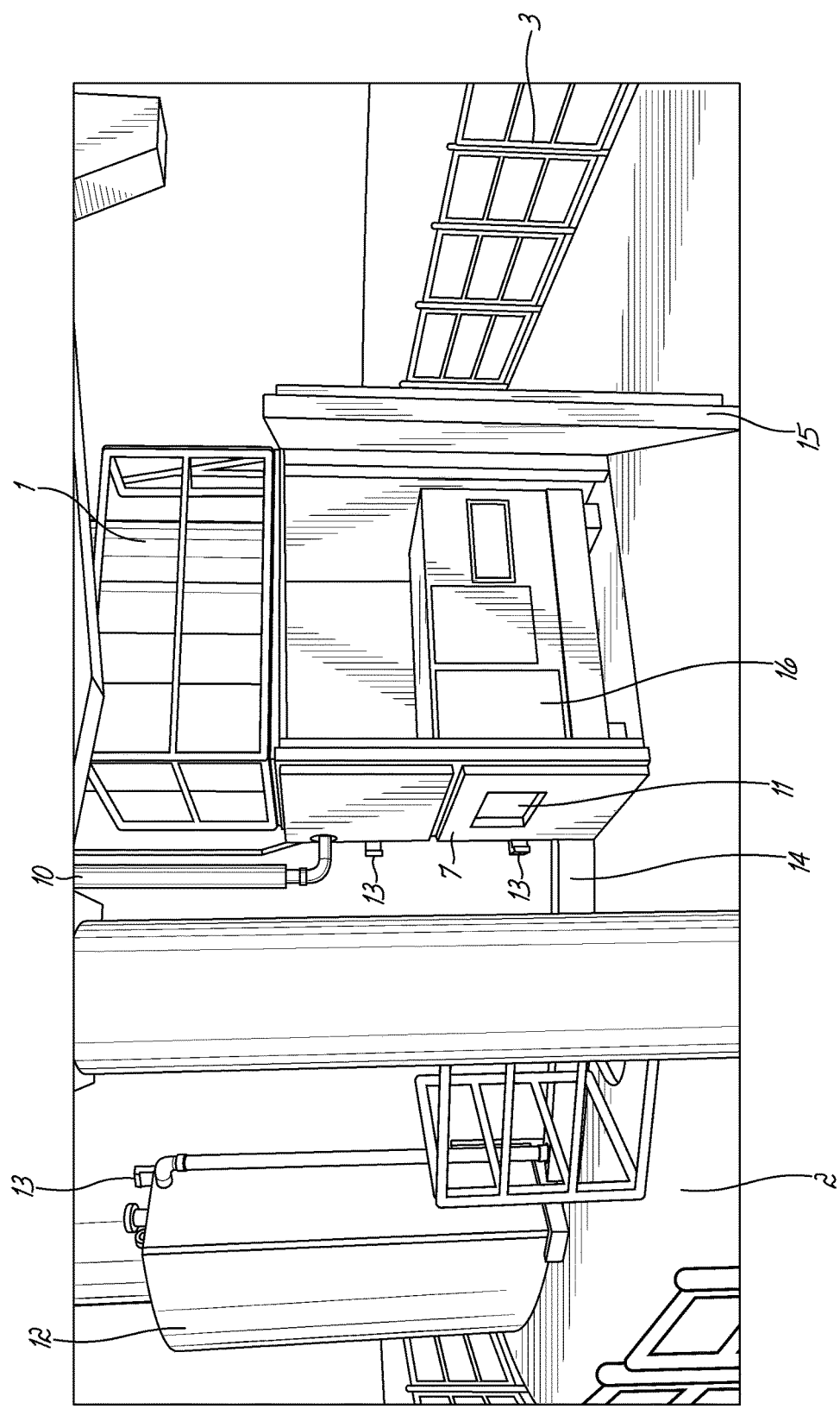
FIG. 3 is a front view of the arrangement of FIG. 1 with the backup generator door open.

Referring to FIG. 3, in which the same reference numbers are again used to indicate the same or corresponding features, the front wall of the generator cabinet 7 forms a door 15 which enables maintenance personnel to access the backup generator 16 inside the generator cabinet 7.

The method of installation of the assembly will now be described with reference to FIGS. 4 and 5(a) to 5(h).

Figure 4:
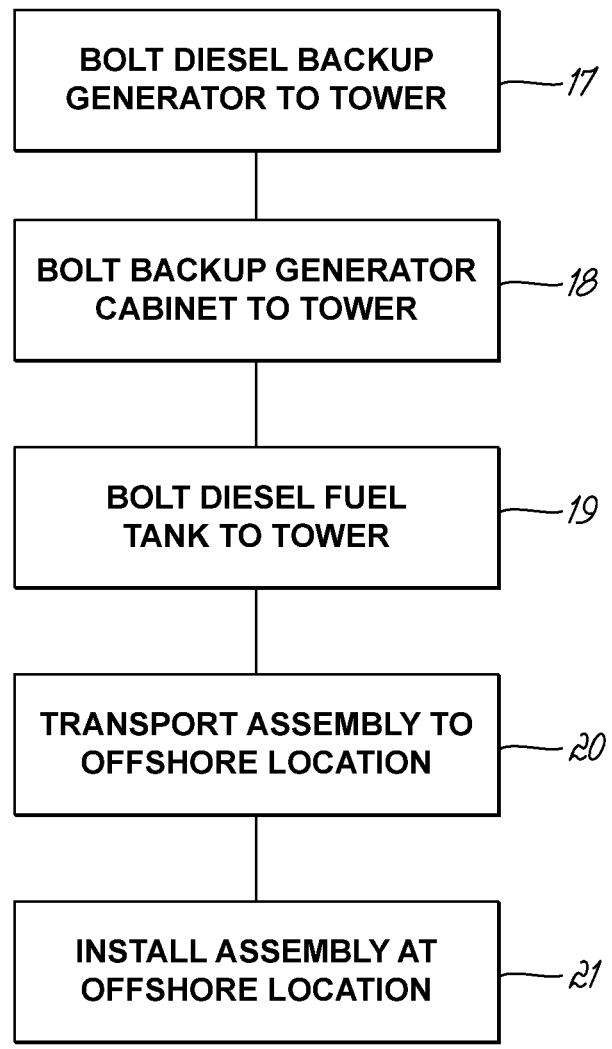
FIG. 4 is a flowchart illustrating a method of installing the assembly of FIG. 1.

Referring to the flowchart of FIG. 4, a diesel backup generator is bolted to the outer wall of a wind turbine tower in step 17. A cabinet for housing the backup generator is then positioned over the generator and bolted to the outer wall in step 18. A diesel fuel tank is bolted to the outer wall of a wind turbine generator tower in step 19. The resulting assembly is then transported to the desired offshore location in step 20. Finally, the assembly is installed in the desired offshore location in step 21.

Figure 5A:
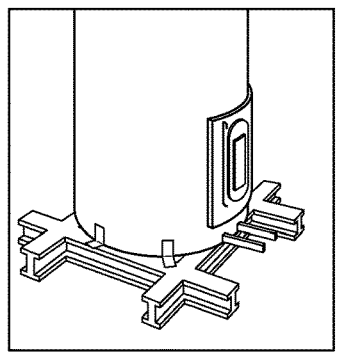
FIGS. 5(a) to 5(h) illustrate in pictorial form a method of installing the assembly of FIG. 1.
Figure 5B:
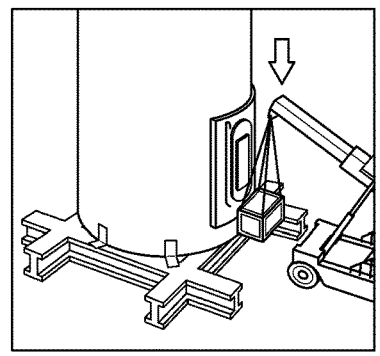
Figure 5C:
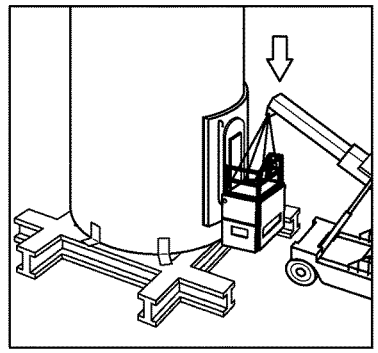
Figure 5D:
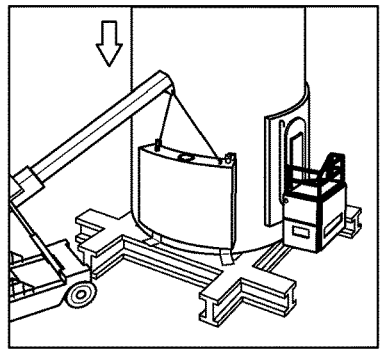
Figure 5E:
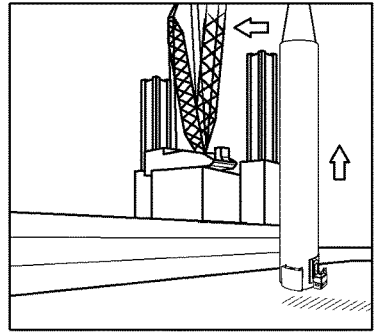
Figure 5F:
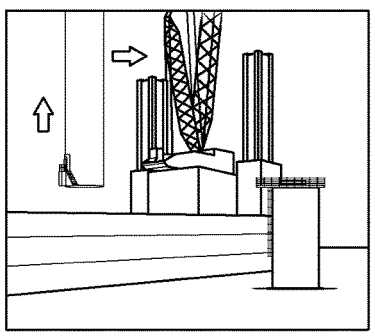
Figure 5G:
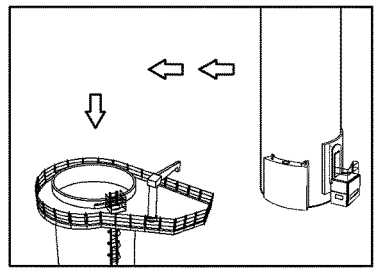
Figure 5H:
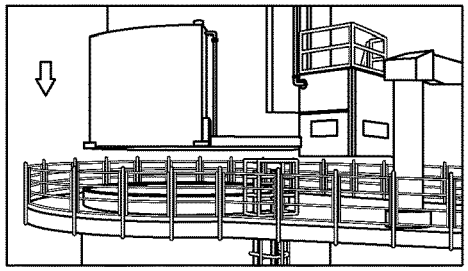

Referring to FIGS. 5(a) to 5(h), support brackets for the diesel generator and diesel fuel tank are first bolted to the tower, in an onshore location (FIG. 5(a)). A diesel generator is then mounted on the associated support brackets (FIG. 5(b)) and bolted to the outer surface of the tower. The generator cabinet and integral stairway are positioned so as to house the diesel generator and are then bolted to the tower (FIG. 5(c)). A diesel tank is then lifted into position on the associated support brackets (FIG. 5(d)) and bolted to the outer surface of the tower. The resulting completed assembly is then lifted on to an installation vessel by a crane mounted on the vessel (FIG. 5(e)). After being transported to the desired offshore location, the assembly is lifted off the installation vessel by the crane (FIG. 5(f)) and moved towards a platform (FIG. 5(g)). Finally, the assembly is installed on the platform (FIG. 5(h)).

Although preferred embodiments of the present invention have been described above, it will be apparent that numerous modifications may be made without departing from the scope of the present invention which is defined by the following claims.

The invention claimed is:

1. An assembly comprising:
a tower for supporting a wind turbine generator, the tower comprising a wall having a top, a base and an outer surface which in use is oriented substantially vertically; and
a backup generator mounted to the outer surface of the wall proximate the base and distal from the top such that the backup generator is closer to the base than to the top, the arrangement being such that the weight of the backup generator is supported substantially only by the wall of the tower; and
a fuel tank for the backup generator, the fuel tank being mounted to the outer wall of the tower, the arrangement being such that the weight of the fuel tank is supported only by the wall of the tower.

2. The assembly as claimed in claim 1, wherein the backup generator is mounted to the wall of the tower by one or more bolts.

3. The assembly as claimed in claim 1, wherein the backup generator is housed within a cabinet.

4. The assembly as claimed in claim 3, wherein the cabinet is mounted to the wall of the tower by one or more bolts.

5. The assembly as claimed in claim 1, wherein the backup generator is powered by fuel.

6. The assembly as claimed in claim 5, wherein the backup generator is a diesel generator.

7. The assembly as claimed in claim 1, further comprising a platform mounted to the tower at a position which, in use, is below the backup generator.

8. A wind turbine generator comprising an assembly as claimed in claim 1.

9. A method of installing a tower for a wind turbine generator, the method comprising forming an assembly as claimed in claim 1 prior to installing the tower.

10. The method as claimed in claim 9, wherein the tower is to be installed at an offshore location, the method comprising forming the assembly at an onshore location.

11. The assembly as claimed in claim 1, wherein the backup generator is configured to generate power independent of a rotor configured to be operatively coupled to the wind turbine generator.

12. An assembly comprising:
   a tower for supporting a wind turbine generator, the tower comprising a wall having an outer surface which in use is oriented substantially vertically;
   a backup generator mounted to the outer surface of the wall, the arrangement being such that the weight of the backup generator is supported substantially only by the wall of the tower;
   a platform mounted to the tower at a position which, in use, is below the backup generator; and
   a stairway arranged between the platform and an upper surface which in use is above the backup generator, the arrangement being such that the upper surface covers the backup generator when viewed downwardly.

13. The assembly as claimed in claim 12, wherein the backup generator is housed within a cabinet, and wherein the cabinet comprises the upper surface.

14. The assembly as claimed in claim 12, wherein the stairway is located adjacent the tower.

* * * * *